(12) United States Patent  
Gupta et al.

(10) Patent No.: US 11,817,118 B2  
(45) Date of Patent: *Nov. 14, 2023

(54) ENHANCING REVIEW VIDEOS

(71) Applicant: ADOBE INC., San Jose, CA (US)

(72) Inventors: Sourabh Gupta, Uttar Pradesh (IN); Mrinal Kumar Sharma, Jharkhand (IN); Gourav Singhal, Delhi (IN)

(73) Assignee: Adobe Inc., San Jose, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/680,916

(22) Filed: Feb. 25, 2022

(65) Prior Publication Data

US 2022/0215860 A1 Jul. 7, 2022

Related U.S. Application Data

(63) Continuation of application No. 17/066,207, filed on Oct. 8, 2020, now Pat. No. 11,302,360.

(51) Int. Cl.

| | |
|---|---|
| *G11B 27/10* | (2006.01) |
| *G06F 3/0482* | (2013.01) |
| *G11B 27/06* | (2006.01) |
| *G11B 27/031* | (2006.01) |
| *G06F 40/279* | (2020.01) |
| *G06F 40/30* | (2020.01) |
| *G06Q 30/0282* | (2023.01) |
| *G06Q 30/0601* | (2023.01) |

(Continued)

(52) U.S. Cl.  
CPC .......... *G11B 27/102* (2013.01); *G06F 3/0482* (2013.01); *G06F 40/279* (2020.01); *G06F 40/30* (2020.01); *G06N 20/00* (2019.01); *G06Q 30/0282* (2013.01); *G06Q 30/0623* (2013.01); *G06Q 30/0641* (2013.01); *G11B 27/031* (2013.01); *G11B 27/06* (2013.01); *G06F 40/216* (2020.01); *G06F 40/284* (2020.01); *G11B 27/11* (2013.01); *G11B 27/34* (2013.01)

(58) Field of Classification Search  
CPC ..... G11B 27/102; G11B 27/031; G11B 27/06; G11B 27/11; G11B 27/34; G06F 3/0482; G06F 40/279; G06F 40/30; G06F 40/216; G06F 40/284; G06N 20/00; G06Q 30/0282; G06Q 30/0623; G06Q 30/0641  
See application file for complete search history.

(56) References Cited

U.S. PATENT DOCUMENTS

| | | | |
|---|---|---|---|
| 11,120,490 B1 * | 9/2021 | Pham | G06Q 30/0625 |
| 2019/0347668 A1 * | 11/2019 | Williams | H04L 51/02 |
| 2020/0090246 A1 * | 3/2020 | Goyal | G06Q 30/0627 |

* cited by examiner

*Primary Examiner* — Quoc A Tran  
(74) *Attorney, Agent, or Firm* — SHOOK, HARDY & BACON L.L.P.

(57) ABSTRACT

Review videos on product pages are enhanced with user interface elements that cause playback of the review videos at points at which particular topics are discussed. A review video is processed by converting speech to text and timestamping the text. Topics are identified in the text, and a time in the review video corresponding to each topic is identified from the timestamps for the text. In some configurations, sentiment is also determined for each topic. User interface elements corresponding to each identified topic are presented with the review video on the product page. When a user viewing the product page selects a user interface element, the review video is played at a time corresponding to the topic of the selected user interface element.

15 Claims, 9 Drawing Sheets

(51) Int. Cl.
*G06N 20/00* (2019.01)
*G11B 27/11* (2006.01)
*G11B 27/34* (2006.01)
*G06F 40/216* (2020.01)
*G06F 40/284* (2020.01)
*G06F 17/00* (2019.01)

ENHANCING REVIEW VIDEOS

CROSS-REFERENCE TO RELATED APPLICATIONS

This patent application is a continuation of U.S. patent application Ser. No. 17/066,207, filed Oct. 8, 2020, which is hereby incorporated herein by reference in its entirety.

BACKGROUND

In the current paradigm of the digital world where shopping is a virtual experience, user-generated reviews of products have become a significant factor in purchasing decisions among buyers. When browsing products on e-commerce sites, buyers often visit the user review sections for products before making purchasing decisions. After making purchases, buyers often want to share their product experience with others by posting reviews. With the exponential rate at which mobile devices have penetrated the global market and with wider access to the Internet, e-commerce sites are continuing to see a large number of product reviews being posted to their platforms. There has also been a surge in user reviews that include videos given the widespread use of smartphones providing an easy way to capture and share videos. User-submitted videos are a powerful tool to share information as the visual format reduces cognitive load and allows buyers to process the reviews at a faster rate than textual reviews.

SUMMARY

Embodiments of the present invention relate to, among other things, enhancing review videos on product pages with user interface elements that allow playback of the review videos at points at which particular topics are discussed. A review video posted on a product page for a product is initially processed by converting speech in the review video to text and timestamping the text. Topics are identified in the text, and a time in the review video corresponding to each topic is identified based on the timestamps for the text. In some configurations, sentiment (e.g., positive or negative) is also determined for each topic. User interface elements corresponding to each identified topic are presented with the review video on the product page. Each user interface element may be labeled with its corresponding topic and may also include a visual indication of the sentiment for the topic. When a user viewing the product page selects a user interface element, the review video is played at a time corresponding to the topic of the selected user interface element. This allows the review video to be played from the point at which the topic is discussed in the review video.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Definitions

Various terms are used throughout this description. Definitions of some terms are included below to provide a clearer understanding of the ideas disclosed herein.

As used herein, a "review video" refers to a user-submitted video posted in the review section of a product page for a product. The review video may comprise the entirety of a user-submitted review or may accompany a textual review. The review video may include both a video component and an audio component. As an example, a user may post a review video of a mobile phone on the product page for the mobile phone.

A "product page" refers to a webpage for a given product. In some instances, a product page may be a webpage at an e-commerce site at which a given product is offered for sale. In other instances, the product page may provide information regarding a given product without offering the product for sale. A product page can include a review section that lists product reviews (including review videos) submitted by users.

A "topic" refers to a feature of a product discussed in a review video. For instance, topics discussed in a review video for a mobile phone may correspond to features of the mobile phone, such as the camera quality, battery life, and display of the mobile phone. In some configurations, a topic is identified in a review video using keywords, and the keywords may be identified at least in part from text on the product page. A keyword comprises any single- or multi-word term (i.e., any n-gram) for identifying topics discussed in the video.

Overview

While user-submitted product review videos provide a powerful way to share product information, the current use of review videos by e-commerce sites presents a number of drawbacks. In particular, review videos are simply presented alone or as part of a textual review in the review section of a product page. There is no way for a buyer perusing the review section to know what features are discussed in each review video. However, buyers are often only interested in a particular feature or subset of features of the product. For a collection of review videos posted on a product page for a product, a buyer doesn't know which videos discuss a feature of interest to the buyer. As a result, the buyer needs to watch a number of review videos before finding ones that discuss the feature of interest. Additionally, when the buyer finally views a review video discussing the feature of interest, the buyer may not be able to quickly glean the sentiment (i.e., positive or negative) associated with the feature.

By way of example to illustrate, a mobile device available for purchase on a product page of an e-commerce site may have a number of features of interest to different users, such as camera quality, battery life, and the display. Review videos posted on the product page may discuss various combinations of these features. When a buyer who is only interested in camera quality visits the product page, the buyer cannot tell which review videos discuss camera quality. The buyer is forced to watch various videos until finding ones that discusses camera quality. In some cases, the buyer may only want to watch review videos that have a certain sentiment for the camera quality (e.g., only negative reviews for the camera quality), making it even harder to find relevant review videos.

Given this, the current use of review videos not only wastes buyers' time, it also results in wasted computing resources. Each time a buyer selects to watch a review video on a user device, a request is transmitted from the user device to a backend server, which has to retrieve the video and stream the video over the network to the user device. This consumes network bandwidth, thereby increasing network latency and decreasing throughput. Additionally, this consumes computing resources of the backend server.

Various embodiments of the technology described herein provide one or more technical solutions to the technical problems described above, as well as other problems. For example, some embodiments improve existing technologies by enhancing review videos on product pages. Generally, a review video is enhanced by identifying topics discussed in the review video and providing user interface elements that allow a user to jump to points in the review video at which each topic is discussed. In some configurations, the sentiment expressed in the review video for each topic is also determined and each user interface element can identify that sentiment.

As an example to illustrate, suppose a review video for a mobile device is processed to identify three topics discussed in the review video: camera quality, battery life, and display. The review video is presented in the review section of the product page for the mobile device with three user interface elements corresponding to the three topics discussed in the review video. Each user interface element can include a label for a corresponding topic. Each user interface element can also provide an indication of the sentiment associated with each topic. When a buyer viewing the product page selects one of the user interface elements, the review video is played from a point at which the topic of the selected user interface element is discussed.

In accordance with some embodiments of the technology described herein, a review video is processed by extracting an audio component from the video and converting speech in the audio component to text. The text is also timestamped to identify a time in the review video at which each word or sentence occurs. Topics are identified in the text based on keywords. In some instances, the keywords are based at least in part on terms occurring in the text of the product page on which the review video is posted. Based on the timestamps for the text, each identified topic is associated with a time in the review video at which the topic is discussed. Additionally, some configurations analyze the text for each topic to determine a sentiment expressed (e.g., positive or negative).

To provide an enhanced review video on a product page, the review video is presented with one or more user interface elements, with each user interface element corresponding to a topic identified in the review video. Each user interface element may include a label identifying its topic. Additionally, each user interface element may present a visual indication of the sentiment associated with its topic. When a user viewing the product page selects a user interface element, a time corresponding with the topic for the selected user interface element is determined, and the review video is played from that time. This allows the user to jump to the point at which a selected topic of interest is discussed.

As a direct result of some embodiments of the technology described herein, users can quickly find review videos discussing topics of interest to the users. Additionally, the review videos can be played from a point in time at which topics of interest are discussed. This reduces the number of review videos selected by users and reduces the extent to which each review video is played. As a result, network bandwidth consumption is reduced, thereby reducing network latency and increasing throughput as compared to conventional systems. Additionally, load on the computing resources of servers providing playback of review videos is reduced.

Example System for Enhanced Review Videos

Figure 1:
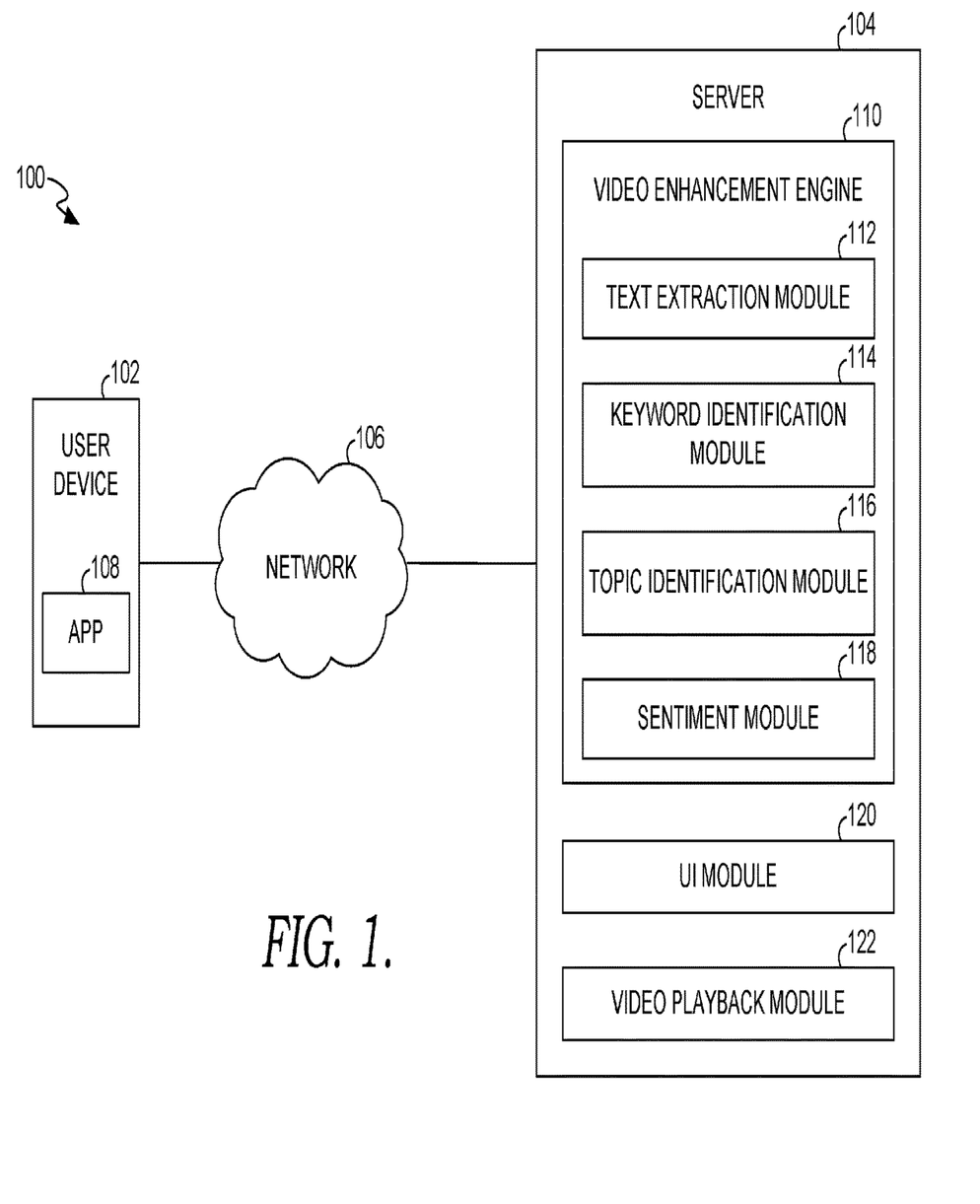
FIG. 1 is a block diagram illustrating an exemplary system in accordance with some implementations of the present disclosure.

With reference now to the drawings, FIG. 1 is a block diagram illustrating an exemplary system for enhancing review videos and serving the enhanced review videos in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a server 104. Each of the user device 102 and server 104 shown in FIG. 1 can comprise one or more computer devices, such as the computing device 900 of FIG. 9, discussed below. As shown in FIG. 1, the user device 102 and the server 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the server 104 could be provided by multiple server devices collectively providing the functionality described herein. Additionally, other components not shown may also be included within the network environment.

As shown in FIG. 1, the server 104 includes a video enhancement engine 110 that processes review videos to identify topics discussed in the review videos and the sentiment of the topics. The video enhancement engine 110 includes a text extraction module 112, a keyword identification module 114, a topic identification module 116, and a sentiment module 118. It should be understood that the modules shown on the server 104 can be implemented using one or more server devices, one or more platforms with corresponding application programming interfaces, cloud infrastructure, and the like. Additionally, while the modules are shown on the server 104 separate from the user device 102 in the configuration of FIG. 1, it should be understood that in other configurations, some or all of the modules can be provided on the user device 102.

The text extraction module 112 extracts text from a review video. For instance, the text extraction module 112 extracts an audio component from the video and performs speech-to text-conversion to convert speech in the audio component to text. The text extraction module 112 also performs timestamping to indicate a time at which each word or sentence (e.g., beginning of sentence) occurs in the video. For instance, the timestamp information may be stored as pairs, such as <word, timestamp> or <sentence, timestamp>. The text extraction module 112 may comprise any number of speech-to-text software, such as the DNN based speech recognition Engine PyAudio Library (https://pypi.org/project/PyAudio/).

In some configurations, the text extraction module 112 also performs preprocessing on the text extracted from a review video. For instance, the text extraction module 112 can remove redundant words, punctuation, pronouns, low-usage words, and/or stopwords (i.e., unimportant words to the content, such as "a", "the", etc.) from the text. Additionally, stemming may be performed to standardize words in the text to their respective root words. The text extraction module 112 may use any number of process tools, such as, for instance, the NTLK lib. The text extracted from the audio component of the video by the text extraction module 112, with or without preprocessing, is referred to herein as "video text."

Figure 6:
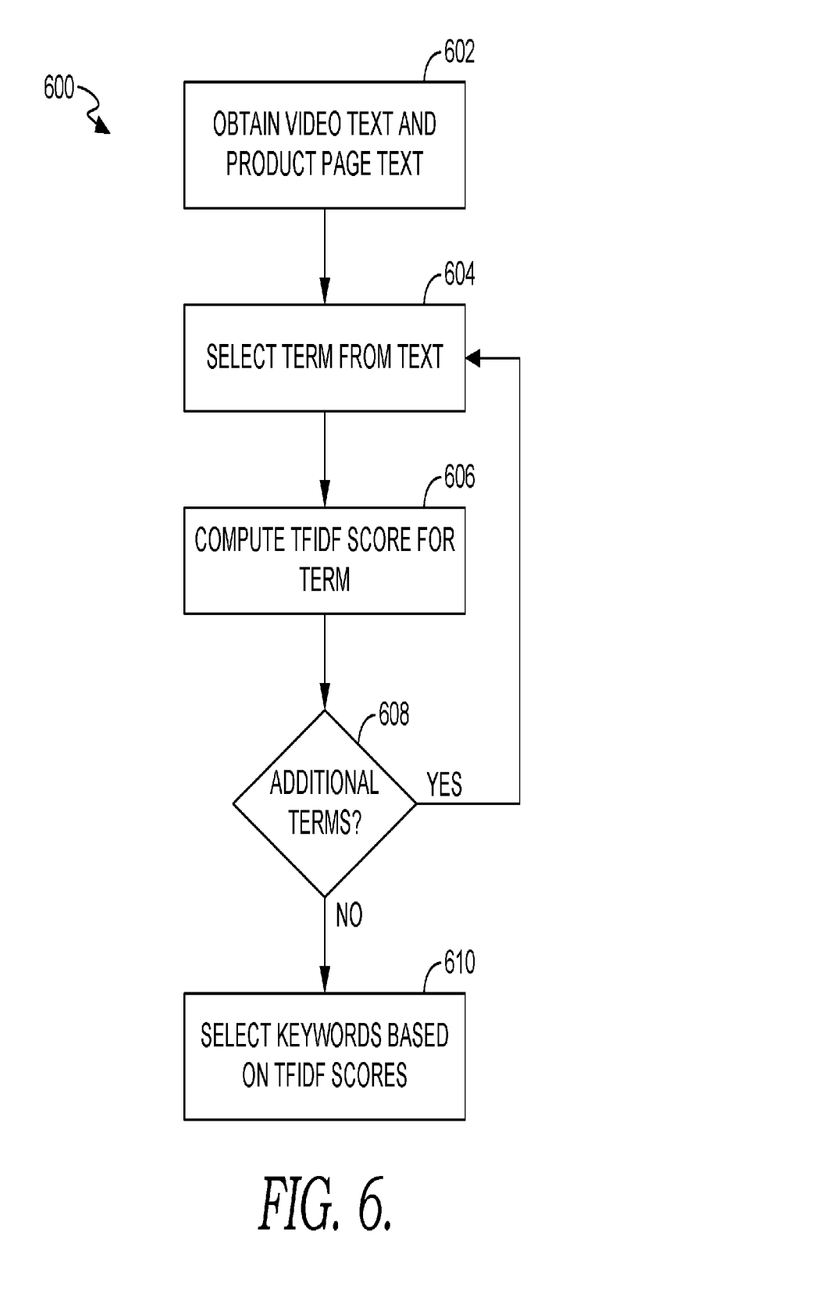
FIG. 6 is a flow diagram showing a method for extracting keywords from text in accordance with some implementations of the present disclosure.

The keyword identification module 114 identifies keywords (i.e., any n-gram) that are used to determine topics discussed on the review video. The keywords may be determined in any of a variety of different ways within the scope of technology discussed herein. In some configurations, the keyword identification module 114 receives manually selected keywords. For instance, the keywords may be manually selected based on the type of product discussed in the video. In other configurations, the keyword identification module 114 identifies the keywords based on text from one or more sources. For instance, the keywords may be identified from the video text and/or text from a product page (referred to herein as "product page text"). The product page text may include text from various locations on a product page, such as the title, description, questions and answers, reviews on the products page The keyword identification module 114 may identify keywords from video text and/or product page text in a variety of different ways within the scope of the technology described herein. For instance, in some configurations, term frequency and inverse document frequency (TFIDF) techniques may be used to identify keywords. This may include calculating TFIDF values of words and/or phrases from text and using the TFIDF values to select keywords. FIG. 6 discussed below provides one method 600 for extracting keywords from text using TFIDF.

The topic identification module 116 processes the video text using the keywords to identify topics discussed in the review video. This may include dividing the video text into time segments, and processing the text from each time segment to determine whether a particular topic is discussed in the time segment. In some configurations, the topic identification component 116 employs a trained model to identify topics. The trained model may comprise a supervised classifier trained on feature vectors with labels identifying product topics most relevant to an e-commerce platform. For instance, the classifier can be trained on feature vectors calculated by the word2vec algorithm. The topic identification module 116 may generate a feature vector for a time segment from a review video based on keywords in the text for the time segment and process the feature vector using the classier, which provides a label for a topic based on the feature vector. In this way, a topic can be determined for each time segment. Adjacent time segments with the same topic can be merged. In this way, the topic identification module 116 generates mapping data comprising a list of topics with corresponding times from the review video at which each topic is discussed in the review video. One particular method for identifying topics in review videos is described in further detail below with reference to FIG. 7.

The sentiment module 118 determines a sentiment for each topic identified for the review video. The sentiment module 118 may comprise any sentiment software, such as the NLTK sentiment analyzer. The sentiment module 118 may process the text for each time segment to determine a sentiment for the topic discussed in the time segment. For instance, the sentiment may be positive, negative, or neutral. The sentiment module 118 generates mapping data correlating the sentiment determined for each topic.

As shown in FIG. 1, the server 104 also includes a user interface (UI) module 120 and a video playback module 122. The UI module 120 provides a user interface to the user device 102 that includes a review video. The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the server 104. The application 108 can be, for instance, a web browser or a dedicated application for requesting a product page from the server 104.

When the user device 102 requests a product page from the server 104, the UI module 120 provides a product page that comprises a user interface with a review video. The UI module 120 also provides user interface elements with the review video. Each user interface element corresponds to a topic discussed in the review video and may be labeled with its corresponding topic. Additionally, each user interface element may provide a visual indication indicating the sentiment associated with each topic.

A user of the user device 102 may select one of the user interface elements, and in response, the UI module 120 receives input indicative of the selected user interface element. The video playback module 122 causes the review video to be played on the user device 102 at a time corresponding to the topic for the selected user interface element. For instance, mapping data correlating the topics discussed in the review video to a time in the video may be used to identify the time for the selected topic. In some embodiments, the user interface provided to the user device 102 may be configured such that when a user interface is selected, the input indicative of the selected user interface element sent to the server 104 may indicate the time in the review video at which to play back the review video.

Figure 2:
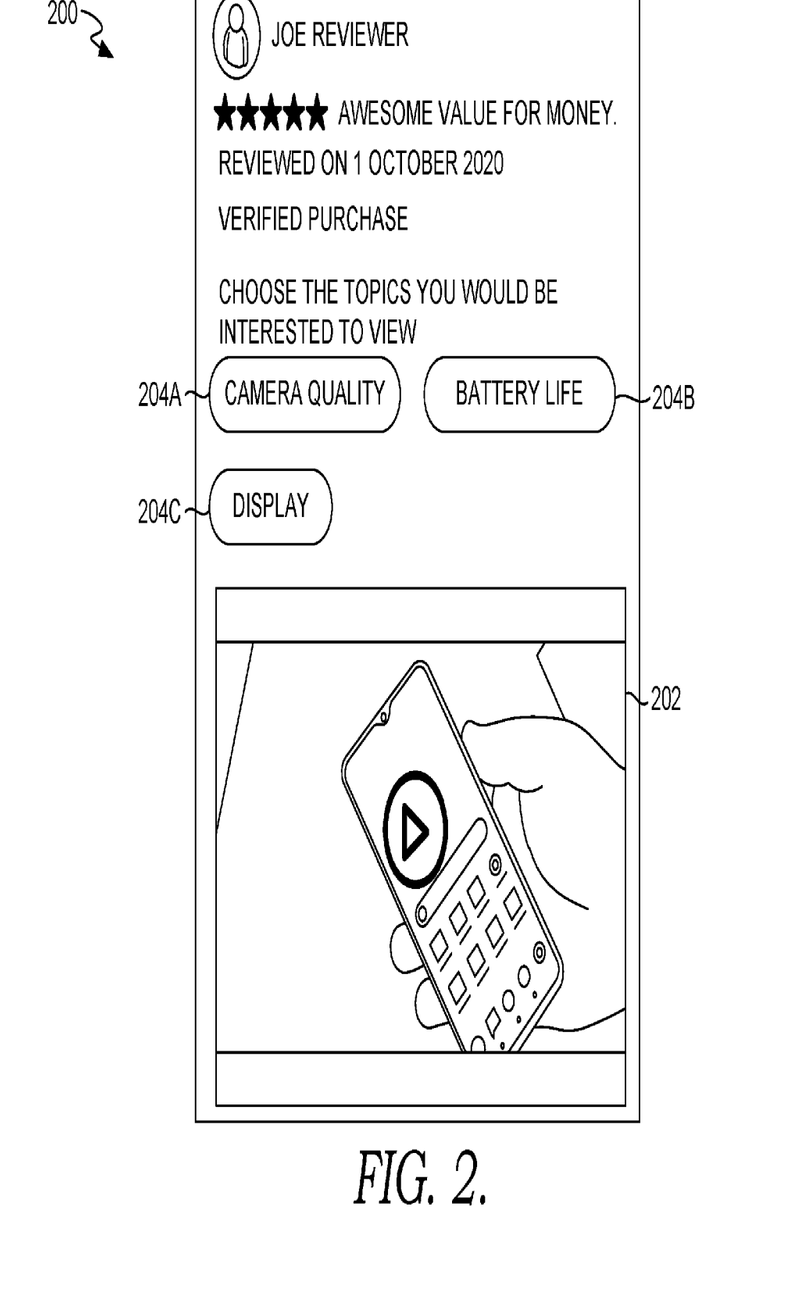
FIG. 2 is a screen shot showing a review video with user interface elements for navigating to particular topics in the review video in accordance with some implementations of the present disclosure.

By way of example to illustrate, FIG. 2 provides a screenshot of a user interface 200 having a video 202 and user interface elements 204A-204C for navigating to particular portions of the video at which identified topics are discussed. In the user interface 200 of FIG. 2, the video 202 is included as part of a user review for a mobile phone, and the user interface elements 204A-204C adjacent to the video indicate topics (i.e., features of the mobile phone) discussed in the video. Each user interface element 204A-204C includes text identifying a corresponding topic discussed in the video 202. For instance, user interface element 204A is labeled "Camera Quality", user interface element 204B is labeled "Battery Life", and user interface element 204C is labeled "Display". Additionally, although not shown in FIG. 2, each user interface element 204A-204C can include a visual indication of the sentiment expressed in the video about the corresponding topic. For instance, each user interface element could be colored green to indicate positive sentiment or red to indicate negative sentiment. It should be understood that other types of visual indicators can be used to show sentiment.

Figure 3:
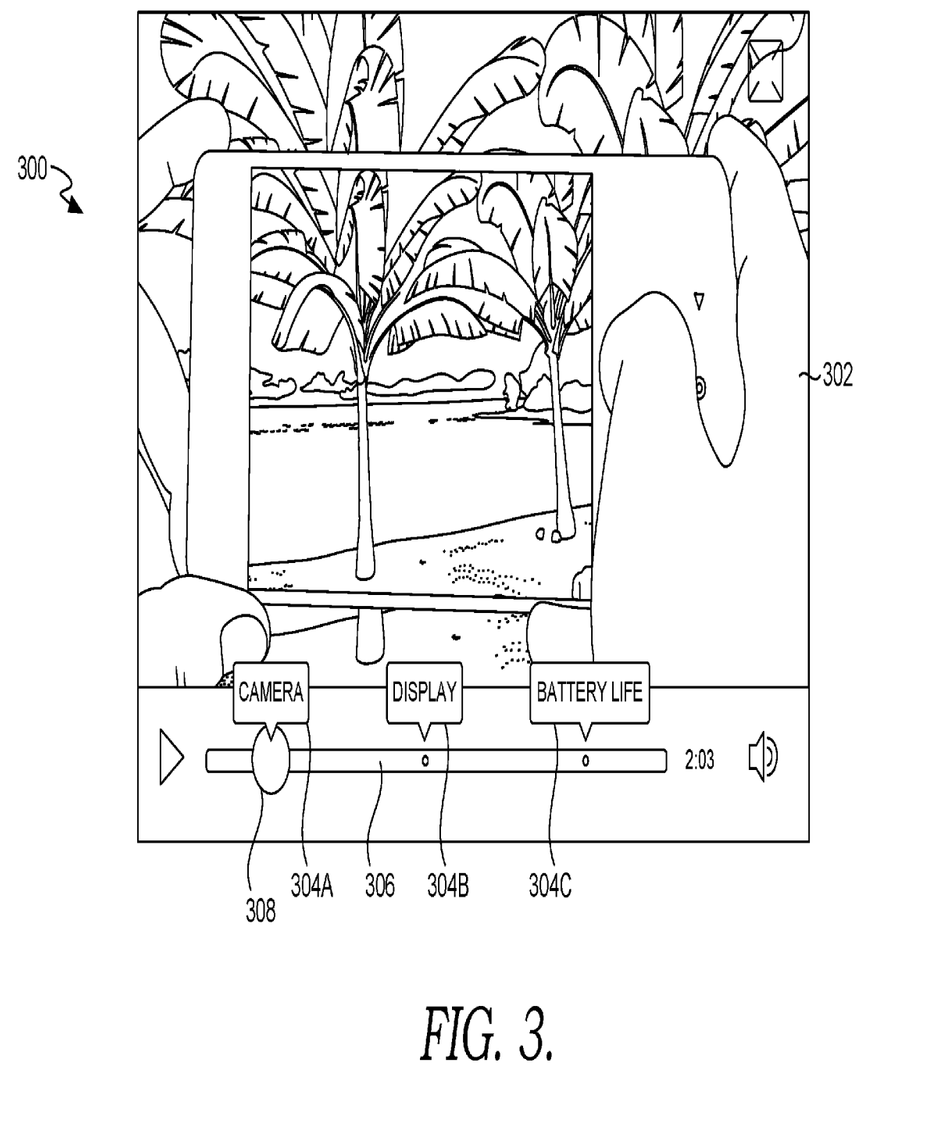
FIG. 3 is a screenshot showing a review video with user interface elements along a seek bar of the review video for navigating to particular topics in the review video in accordance with some implementations of the present disclosure.

When a user selects one of the user elements 204A-204C, playback of the video is presented at the time in the video corresponding to the topic for the selected user interface element. For instance, FIG. 3 provides a screenshot showing a user interface 300 in which the user selected the user interface element 204A in FIG. 2 corresponding with the camera quality topic. As shown by the seek bar 306 below the video 302, the video 302 has jumped to a location corresponding to the camera quality topic in response to the user selection of the user interface element 204A from FIG. 2. As such, the user can readily view the portion of the video discussing the camera quality of the mobile phone.

As can be seen from FIG. 3, the user interface 300 locates the use interface elements 304A-304C at a location along the seek bar 306 at which the topic corresponding with each user interface element is discussed. In this way, the user can move the progress indicator 308 in the seek bar 306 to move the video forward or backward to a particular topic of interest. Alternatively, the user can select one of the user interface elements 304A-304C to jump to a point in the video discussing the topic corresponding with the selected user interface element. For instance, if the user were to select the user interface element 304C for the battery life topic, the video would jump to the point at which the mobile phone's battery life is discussed.

Figure 4:
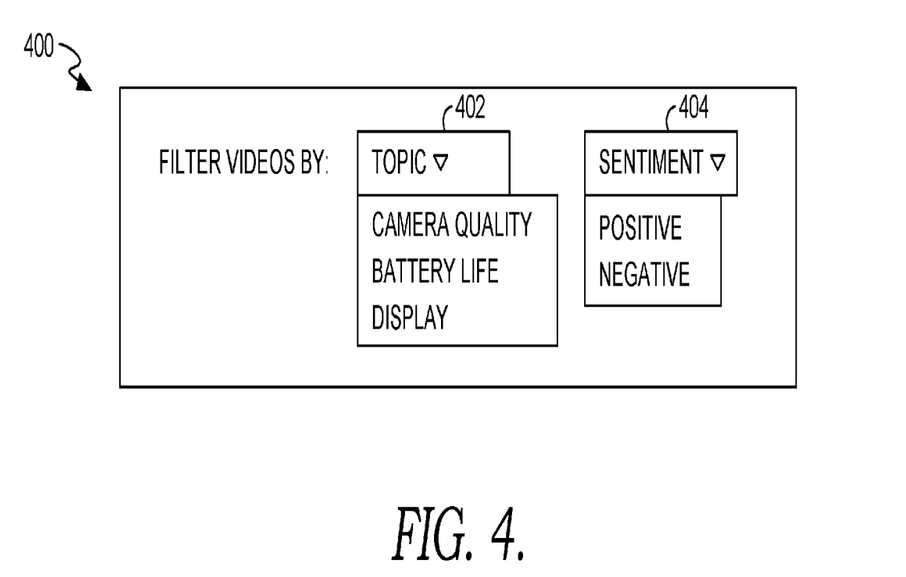
FIG. 4 is a screenshot showing user interface elements for filtering review videos based on topics and sentiment in accordance with some implementations of the present disclosure.

In some configurations, the user interface provided by the UI module 120 includes user interface elements for filtering review videos on a product page based on topics and/or sentiment. In particular, a product page for a given product often includes a number of review videos from different users. While the user viewing the product page can scroll through the various review videos with their corresponding user interface elements to identify videos to watch, in some configurations, the user interface provides the ability for the user to filter the review videos on the product page. By way of example to illustrate, FIG. 4 provides a user interface portion 400 for filtering review videos provided on a product page for a mobile device. As shown in FIG. 4, the user interface portion 400 includes a drop down box 402 for selecting a topic and a drop down box 404 for selecting sentiment. The drop down box 402 is populated with topics identified for review videos on the product page. As an example, if the user viewing the product page wishes to see review videos discussing camera quality, the user may select camera quality from the drop down box 402. As another example, if the user wishes to see positive reviews for battery life, the user can select battery life from the drop down box 402 and positive from the drop down box 404. As a further example, if the user wishes to see videos with positive reviews regardless of topic, the user can select positive from the drop down box 404 without selecting a topic from the drop down box 402.

Example Methods for Enhanced Review Videos

Figure 5:
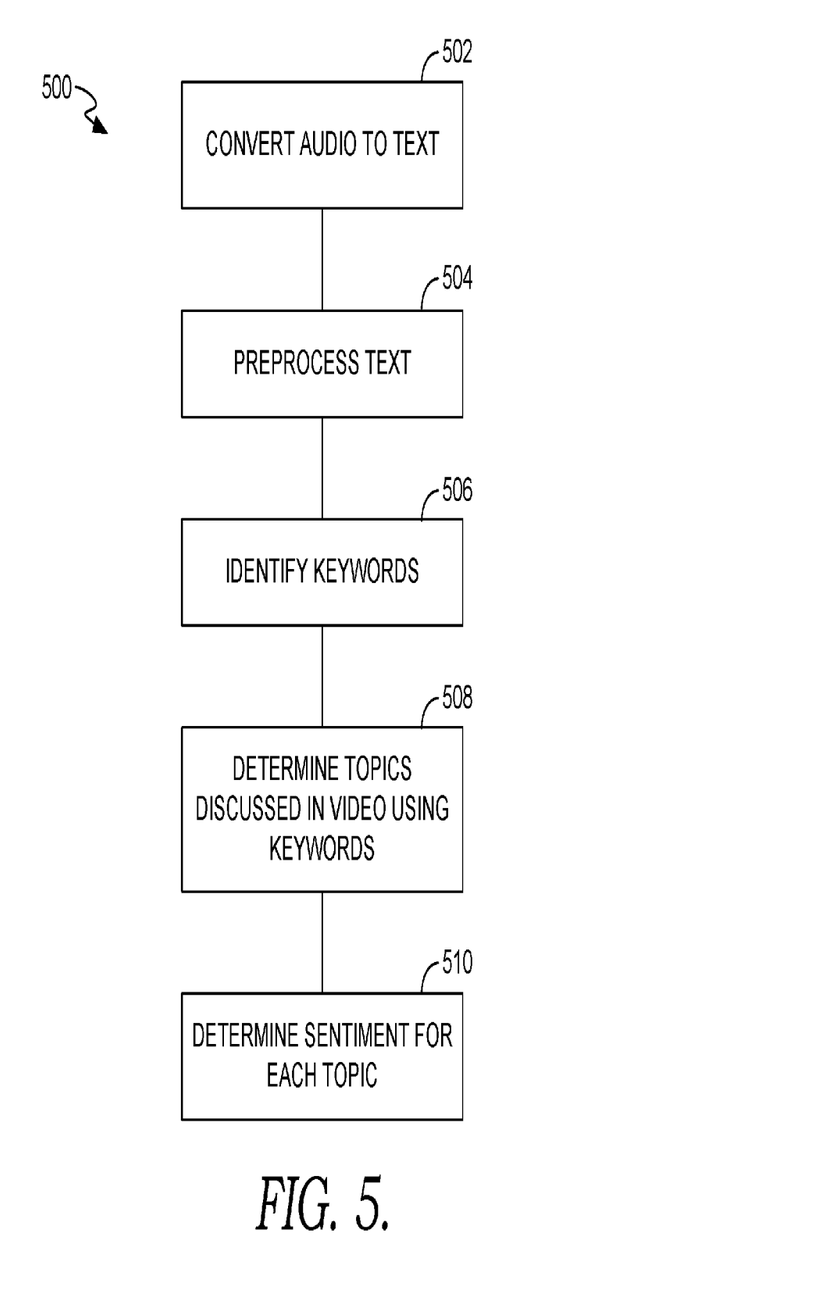
FIG. 5 is a flow diagram showing a method for generating an enhanced review video in accordance with some implementations of the present disclosure.

With reference now to FIG. 5, a flow diagram is provided that illustrates a method 500 for generating an enhanced review video. The method 500 may be performed, for instance, by video enhancement engine 110 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, the video is processed to convert audio in the video to text. The processing includes extracting an audio component from the video and performing speech-to-text conversion on the extracted audio component to output text for further processing. One example of a speech-to-text software that is suitable for use with the current technology is DNN based speech recognition Engine PyAudio Library (https://pypi.org/project/PyAudio/). However, it should be understood that other speech-to-text software may also be suitable for use. Additionally, the text is timestamped to indicate a time at which each word or sentence (e.g., beginning of sentence) occurs in the video. For instance, the timestamp information may be stored as pairs, as shown below:

<word, timestamp>
<sentence, timestamp>

In some configurations, the text extracted from the video is preprocessed, as shown at block 504. Any number of processing techniques may be applied to the text. By way of example only and not limitation, the text preprocessing may include removal of redundant words, punctuation, pronouns, low-usage words, and/or stopwords (i.e., unimportant words to the content, such as "a", "the", etc.) from the text. Additionally, stemming may be performed to standardize words in the text to their respective root words. The text preprocessing may be performed, for instance, using the NTLK lib, although other preprocessing tools may be employed within the scope of the technology described herein. The text extracted from the audio component of the video, with or without preprocessing, is referred to herein as "video text."

Keywords are identified at block 506. A keyword comprises any single- or multi-word term (i.e., any n-gram) for identifying topics discussed in the video, as will be described in further detail below. In some configurations, the keywords are manually determined based on the type of product. For instance, if the product is a mobile device, a predetermined set of keywords manually selected for mobile devices would be identified. In further configurations, the keywords are extracted from text from any of a variety of locations. For instance, the keywords may be extracted from the video text and/or text from a product page (e.g., title, description, questions and answers, FAQs provided by the seller, etc.). Text from a product page is referred to herein as "product page text." The product page text may include text from the product page at which the video is located, text from all product pages for similar products, and/or text from all product pages regardless of product type. For instance, if the product page is for a mobile phone, the product page text could come from the product page for that mobile phone, all product pages for the same make and model of the mobile phone, product pages for all mobile phones, and/or product pages for all products listed at the site.

It should be understood that different keyword extraction methods may be employed to identify keywords from video text and/or product page text within the scope of the technology described herein. In some configurations, term frequency and inverse document frequency (TFIDF) techniques may be used to identify keywords. This may include calculating TFIDF values of words and/or phrases from text and using the TFIDF values to select keywords.

One method 600 for extracting keywords from text using TFIDF is shown in FIG. 6. The method 600 may be performed, for instance, by the keyword identification module 112 of FIG. 1. It should be understood that the method 600 is provided by way of example only and not limitation. Other approaches for extracting keywords with or without the use TFIDF may employed with the scope of technology described herein.

As shown at block 602, text is obtained from the audio component of a video (i.e., video text) and from one or more product pages as identified above (i.e., product page text). A term is selected at block 604, and a TFIDF score is computed for the term, as shown at block 606. The TFIDF score can be computed, for instance, as follows:

TFIDF(ith term)=term_ith_frequency/total_number_of_terms where term_ith_frequency comprises the frequency of term i appearing in the video text and the total_number_of_terms comprises the total number of terms in the video text and product page text.

As shown at block 608, a determination is made whether additional terms are available for scoring. If so, a new term is selected at block 604 and a TFIDF score is computed for the new term at block 606. The process repeats until a TFIDF score has been computed for each term, and the process proceeds to block 610 at which keywords are selected based on the TFIDF score for each term. For instance, in some configurations, all terms with a TFIDF score above a threshold value are selected as keywords, while terms with a TFIDF score below the threshold value are discarded. In other configurations, the terms are ranked based on TFIDF score, and a certain number (N) of terms with the highest TD/IDF scores are selected as keywords.

Returning to FIG. 5, topics discussed in the video are identified at block 508 using the keywords identified at block 506. Each topic represents a particular product feature discussed in the video. For instance, for a mobile device, topics could include camera quality and battery life.

Figure 7:
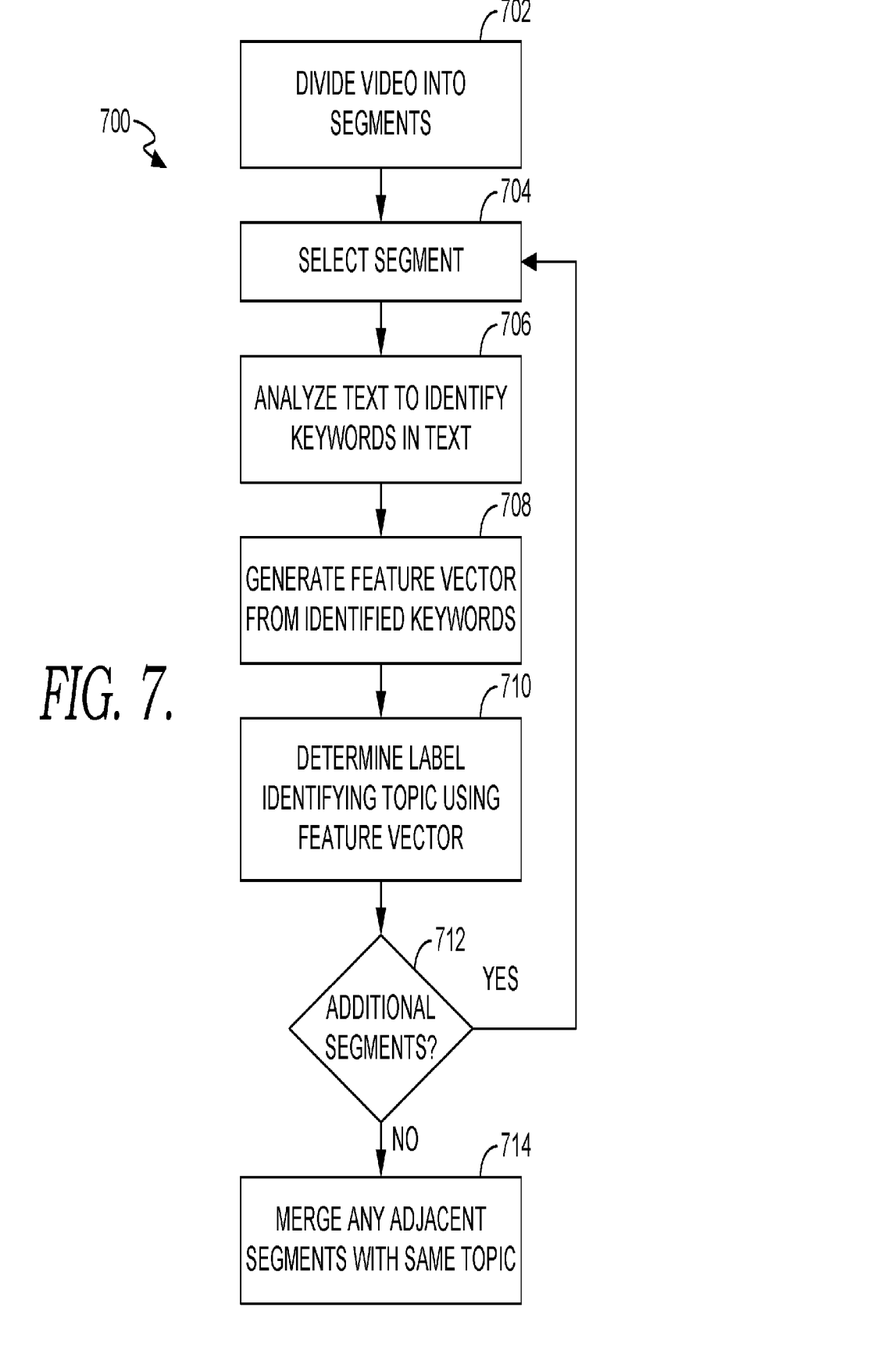
FIG. 7 is a flow diagram showing a method for identifying topics discussed in a video in accordance with some implementations of the present disclosure.

One method 700 for identifying topics discussed in a video using keywords is described with reference to FIG. 7. The method 700 may be performed, for instance, by the topic identification module 114 of FIG. 1. It should be understood that the method 700 is provided by way of example only and not limitation, and other approaches for identifying topics in a video can be employed. As shown at block 702, text from the video is divided into time segments of n length (e.g., every 20 seconds). Text corresponding with each time segment may be determined using the timestamps for the text. A time segment is selected at block 704. For the selected time segment, text from the time segment is analyzed to identify any keywords included in the text, as shown at block 706. The identified keywords are used to generated a feature vector (e.g., using the word2vec algorithm), as shown at block 708.

A label identifying a topic is determined using the feature vector, as shown at block 710. The label may be identified by feeding the feature vector to the forward propagation in a trained model. The trained model may comprise a supervised classifier trained on feature vectors with labels having product topics most relevant to an e-commerce platform. For instance, the classifier can be trained on feature vectors calculated by the word2vec algorithm.

A determination is made at block 712 regarding whether each segment has been processed. If not, the process of blocks 704 through 710 is repeated for each segment of the video until all segments have been processed. As shown at block 714, if any adjacent segments are identified to have the same topic, the time segments are merged. By way of example only and not limitation, the NLTK lib (https://www.nitk.org/_modules/nitk/corpus/reader/lin.html) could be used to determine similarity. For instance, if the first and second 20 second segments in a video are identified as corresponding with the camera quality topic, the two segments are merged together and identified as corresponding to the camera quality topic (e.g., <TS1: 00:01-00:40; camera quality>. The outcome of the method 700 is a list of time segments along with the topic (if any) assigned to each time segment. Note that some segments may not have an associated topic. The list comprises mapping data that correlates each topic to its corresponding time segment in the video.

Returning to FIG. 5, as shown at block 510, a sentiment for each identified topic is determined in some configurations. As noted above, the output from block 508 is a list of time segments with corresponding topic for each segment (although some segments may have a corresponding topic). For each time segment with a corresponding topic, text from the time segment is analyzed to determine a sentiment. For instance, the sentiment may be positive, negative, or neutral. The sentiment may be determined using the NLTK sentiment analyzer, which calculates a sentiment score for each sentence in a segment. The overall sentiment score of the time segment may then be computed as an average of the sentiment scores for the sentences in the time segment. Based on the overall sentiment score for the time segment, the sentiment for the topic in the time segment can be identified as positive, negative, or neutral. The sentiment for each topic may be stored with the mapping data by correlating each topic with its determined sentiment.

Figure 8:
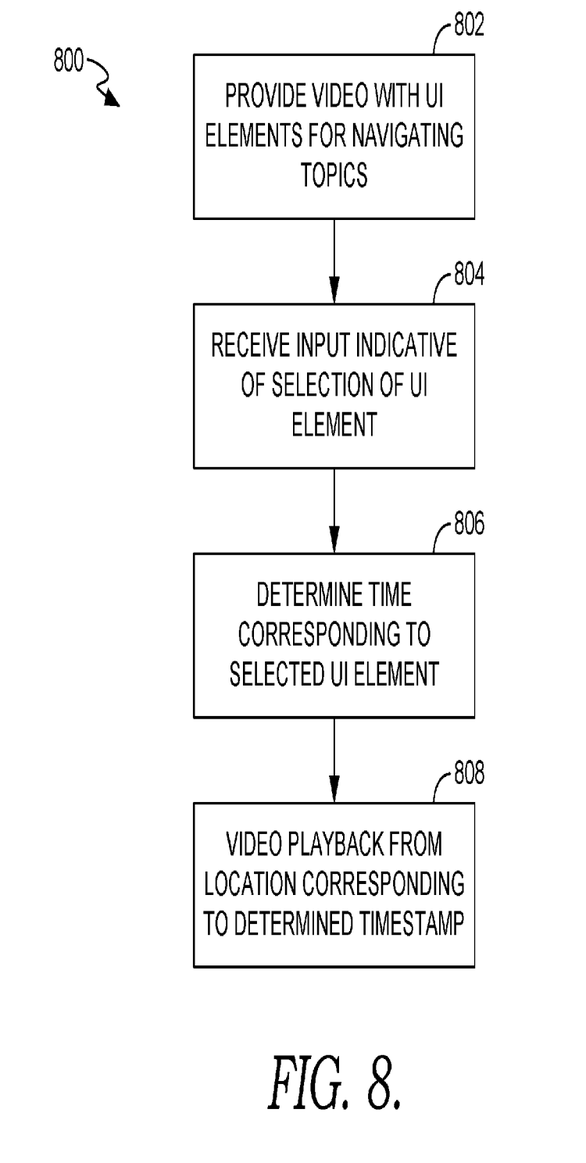
FIG. 8 is a flow diagram showing a method for navigating a review video using topic user interface elements in accordance with some implementations of the present disclosure.

Turning now to FIG. 8, a flow diagram is provided showing a method 800 for navigating a video using topic user interface elements. The method 800 may be performed, for instance, by the UI module 120 and the video playback module 122 of FIG. 1.

As shown at block 802, a user interface is provided that presents a video and one or more user interface elements for navigating to topics discussed in the video. Each user interface element provides an indication of a topic discussed in the video. The topic may have been identified in the video, for instance, using the method 500 of FIG. 5. In some instances, each user interface element also indicates a sentiment about the corresponding topic expressed in the video.

For example, the user interface element may be a tag labeled with the corresponding topic and color-coded to reflect whether the sentiment for that feature is positive, negative, or neutral.

Input indicative of a selection of one of the user interface elements is received, as shown at block 804. A time in the video corresponding to the selected user interface element is determined, as shown at block 806. This may be accomplished, for instance, by referencing mapping data that correlates each topic identified in the video with a corresponding time segment or timestamp in the video. Video playback is moved to a location in the video corresponding with the determined time, as shown at block 808. In this way, a user can employ the user interface elements to select a topic of interest and jump to the portion of the video at which that topic of interest is discussed.

Exemplary Operating Environment

Figure 9:
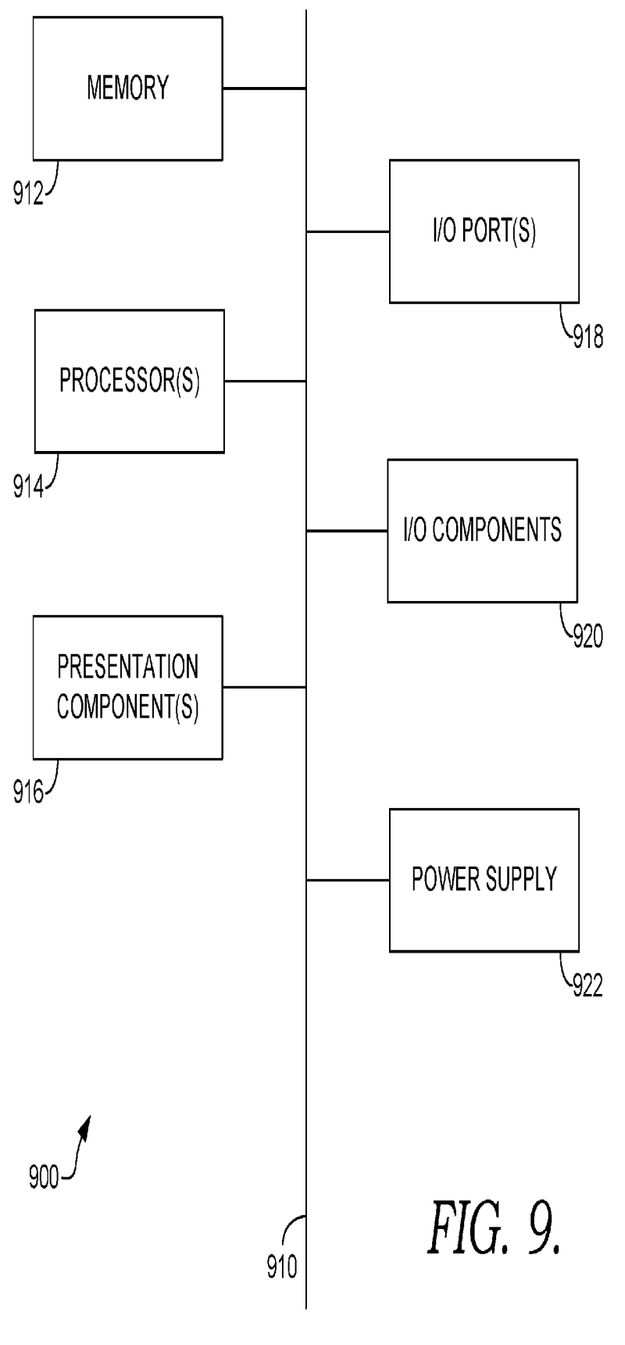
FIG. 9 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method comprising:
converting, by a text extraction module, audio from a review video for a product to text;
determining, by a topic identification module, topics in the text from the review video using keywords identified based at least in part on terms in text on a product page for the product, each topic corresponding to a time segment of the review video, wherein determining the topics in the text from the review video comprises:
dividing the review video into a plurality of time segments,
determining the topic for each time segment by: generating a feature vector from keywords in the text for the time segment of the review video, providing the feature vector to a classifier trained on labeled feature vectors, and receiving, from the classifier, a topic label determined by the classifier based on the feature vector, and
merging adjacent time segments having the same topic;
providing, by a user interface module, a user interface for presentation on a client device, the user interface including the review video and a user interface element for each topic;
receiving, by the user interface module, input indicative of a selection of a first user interface element identifying a first topic; and
causing, by a video playback module, playback of the review video at a time based on a first time segment corresponding to the first topic.

2. The computerized method of claim 1, wherein each user interface element is positioned along a seek bar for the review video at a location corresponding to the time segment for each user interface element.

3. The computerized method of claim 1, wherein the keywords are determined using term frequency-inverse document frequency (TFIDF) scores for terms in the text from the video and/or the text from the product page.

4. The computerized method of claim 1, wherein the operations further comprise:
determining a sentiment for each topic; and
storing mapping data correlating each topic to the sentiment determined for each topic.

5. The computerized method of claim 4, wherein each user interface element includes a visual indicator of the sentiment for the topic corresponding to each user interface element.

6. A computer system comprising:
a processor; and
a computer storage medium storing computer-useable instructions that, when used by the processor, cause the computer system to:
convert, by a text extraction module, an audio component of a review video for a product to text;
identify, by a keyword identification component, keywords based at least in part on text from a product page for the product;
determine, by a topic identification component, topics in the text from the review video using the keywords, each topic corresponding with a time segment from a plurality of time segments of the review video, wherein the topics in the text from the review video are determined by:
dividing the review video into the plurality of time segments,
determining the topic for each time segment by: generating a feature vector from keywords in the text for the time segment of the review video, providing the feature vector to a classifier trained on labeled feature vectors, and receiving, from the classifier, a topic label determined by the classifier based on the feature vector, and
merging adjacent time segments having the same topic; and
generate, by the topic identification component, mapping data correlating each topic to the time segment of the review video corresponding to each topic.

7. The computer system of claim 6, wherein the instructions further cause the computer system to:
provide, with the review video on the product page, a user interface element for each topic;
receive input indicative of a selection of a first user interface element corresponding to a first topic;
determine a first time segment for the first topic from the mapping data; and
cause playback of the review video at a time corresponding to the first time segment.

8. The computer system of claim 7, wherein each user interface element is positioned along a seek bar for the review video at a location corresponding to the time segment for each user interface element.

9. The computer system of claim 7, wherein the instructions further cause the computer system to:
determine a sentiment for each topic; and
wherein each user interface element includes a visual indicator of the sentiment for the topic corresponding to each user interface element.

10. The computer system of claim 6, wherein the keywords are determined using term frequency-inverse document frequency (TFIDF) scores for terms in the text from the video and/or the text from the product page.

11. One or more non-transitory computer storage media storing computer-useable instructions that, when used by a processor, causes the processor to perform operations comprising:
providing, for presentation, a product page with a review, the review including a video and user interface elements, each user interface element identifying a topic from a plurality of topics discussed in the video, at least one topic having been identified using a keyword identified based at least in part on text from the product page, wherein the plurality topics are identified by:
dividing the video into a plurality of time segments,
determining the topic for each time segment by: generating a feature vector from keywords from the time segment of the review video, providing the feature vector to a classifier trained on labeled feature vectors, and receiving, from the classifier, a topic label determined by the classifier based on the feature vector, and
merging adjacent time segments having the same topic;
receiving input indicative of a selection of a first user interface element;
determining, from mapping data correlating each user interface element to a time in the video, a first time corresponding to the first user interface element; and
causing playback of the video at the first time.

12. The one or more non-transitory computer storage media of claim 11, wherein each user interface element provides a visual indication of a sentiment associated with the topic corresponding with each user interface element.

13. The one or more non-transitory computer storage media of claim 11, wherein each user interface element is positioned along a seek bar for the video at a location corresponding to the time for each user interface element.

14. The one or more non-transitory computer storage media of claim 11, wherein the operations further comprise:
converting audio from the video to text;
determining the topics in the text from the video using keywords identified based at least in part on terms in the text on the product page for the product; and
generating the mapping data correlating each user interface element to a time in the video.

15. The one or more non-transitory computer storage media of claim 14, wherein the keywords are determined using term frequency-inverse document frequency (TFIDF) scores for terms in the text from the video and/or the text from the product page.

* * * * *